United States Patent
Gottschalk (10) Patent No.: US 6,883,813 B2
(45) Date of Patent: Apr. 26, 2005

(54) INDEPENDENT PADDLE LIFT AXLE SUSPENSION SYSTEM

(75) Inventor: Michael J. Gottschalk, Granville, OH (US)

(73) Assignee: The Boler Company, Itasca, IL (US)

( * ) Notice: Subject to any disclaimer, the term of this patent is extended or adjusted under 35 U.S.C. 154(b) by 116 days.

(21) Appl. No.: 10/373,024

(22) Filed: Feb. 26, 2003

(65) Prior Publication Data

US 2004/0164511 A1 Aug. 26, 2004

(51) Int. Cl.[7] .............................................. B62D 61/12
(52) U.S. Cl. ................... 280/86.5; 180/24.02; 180/209
(58) Field of Search ..................... 280/86.5, 124.11, 280/124.157, FOR 161; 180/24.02, 209

(56) References Cited

U.S. PATENT DOCUMENTS

| | | | |
|---|---|---|---|
| 3,285,621 A | * 11/1966 | Turner, Jr. | ................ 280/81.1 |
| 3,510,149 A | 5/1970 | Raidel | |
| 3,771,812 A | 11/1973 | Pierce et al. | |
| 3,861,708 A | 1/1975 | Fier | |
| 3,902,734 A | 9/1975 | Fier | |
| 3,904,220 A | 9/1975 | Fier | |
| 4,792,148 A | 12/1988 | Hintz | |
| 4,881,747 A | 11/1989 | Raidel | |
| 5,015,004 A | 5/1991 | Mitchell | |
| 5,018,756 A | 5/1991 | Mitchell | |
| 5,058,916 A | 10/1991 | Hicks | |
| 5,403,031 A | 4/1995 | Gottschalk et al. | |
| 5,540,454 A | * 7/1996 | VanDenberg et al. | ...... 280/81.1 |
| 6,158,750 A | * 12/2000 | Gideon et al. | ............. 280/86.5 |
| 6,796,566 B1 | * 9/2004 | VanDenberg | .............. 280/86.5 |

* cited by examiner

*Primary Examiner*—Eric Culbreth
(74) *Attorney, Agent, or Firm*—Hall, Myers, Vande Sande & Pequignot (57) ABSTRACT

An auxiliary lift axle suspension of the parallelogram type is constructed for heavy duty operation by providing longitudinal control arms at the corners of a parallelogram configuration extending between the axle connecting member and the frame hanger bracket. A lift bellows is then located between two opposing rigidity providing, U-shaped members (called paddles or stabilizer members) located within the three dimensional parallelogram space, wherein the legs of one U-shaped member are connected to the axle connecting member and the legs of the opposing U-shaped member are connected to the hanger bracket, such that the lift bellows is located between the bases of the opposing paddles and expands bi-directionally to lift the wheels of the suspension from the road surface.

18 Claims, 5 Drawing Sheets

INDEPENDENT PADDLE LIFT AXLE SUSPENSION SYSTEM

This invention relates to auxiliary lift axle suspension systems for wheeled vehicles such as heavy duty dump trucks and trailers. More particularly, this invention relates to auxiliary lift axle suspension systems having an improved mechanism for selectively lowering and lifting the wheel bearing auxiliary axle of a vehicle into and out of road engagement.

BACKGROUND OF THE INVENTION

The need for certain vehicles such as heavy duty dump trucks, semi-trailers and the like, to have at least one (and often more than one) designated wheel bearing axle suspension system(s) capable of being raised and lowered selectively into and out of load bearing engagement with the road surface, is well-known in the art. This need usually arises in order that the vehicle be capable of legally satisfying maximum highway weight limit laws, as well as to provide an additional measure of safety when the vehicle is loaded. In this respect, such maximum weight limit laws often mandate, not just a maximum vehicle weight, but further prescribe (e.g., as by the so-called "bridge formula") that the required number of axles needed be spaced in such a manner so as to distribute the weight of the vehicle and its cargo over a selected length of the vehicle. Such extra axles and their attached suspension systems are often referred to as "auxiliary" axle suspension systems.

The ability to lawfully carry the maximum weight of the load (cargo) allowed by law often translates economically into maximized profit and a more economically efficient use of the vehicle. However, it is also known that when the vehicle has one or more auxiliary axles added to its standard front and rear axles, three basic drawbacks arise when the wheels of the auxiliary axle(s) are in road engagement. The first is that cornering can become difficult. The second is that fuel efficiency can be reduced. Finally and third, is that tire wear can increase.

To overcome these drawbacks, the truck/trailer suspension art has designed and developed over the years numerous auxiliary axle suspension systems which are provided with a mechanism which when activated, usually from the cab of the truck or trailer, enables the wheels to be selectively raised out of or lower into load bearing engagement with the road surface, thus, mitigating (reducing) the above-described problems associated with auxiliary axle usage. Moreover, in those systems which are properly designed, when lowered into road engagement the suspension assumes its proper, safe and lawful share of the load. When not needed (e.g., when the truck is empty) properly designed suspensions can be activated to raise the wheels off the road surface a sufficient distance and maintain them at this distance from the road thereby to prevent inadvertent road contact, even when experiencing a curb or road bed irregularly. In this way, the system results in prolonged tire life and less fuel usage while making cornering easier when these "auxiliary" wheels can be lifted when cornering.

While numerous types of auxiliary lift axle suspension systems have been devised, only a relatively few types have been recognized as safe and effective for their intended purpose, and/or found over the years to be truly commercially acceptable. In this respect, the truly effective, safe and commercially acceptable designs are generally recognized as falling into three basic types of lift axle suspension configurations. They are: (1) the use of an inverted leaf spring as both the lift mechanism and as a longitudinal tracking beam, accompanied by an air bellows, deflated at lift position but when inflated against the leaf spring's upward bias, lowers the suspension into road engagement thereby achieving a full load bearing, air-ride characteristic (e.g., as disclosed in U.S. Pat. No. 3,285,621); (2) the use of a longitudinal, heavy, tracking beam and an opposing air-bellows arrangement at either end of the beam (as first pioneered in commercially successful form by Neway Corporation and later adopted by others); and (3) the use of various types of lift mechanisms in combination with a highly stable, weight reducing, parallelogram suspension configuration (perhaps one of the most successful of this type lift suspension to date being those embodiments as disclosed in U.S. Pat. No. 5,403,031).

Each of these three basic designs has its own distinctive features making it the choice of design of certain vehicle operators. Currently, however, most knowledgeable heavy duty truck and trailer operators recognize that for many commercial operations the characteristics resulting from the "parallelogram" type lift suspension result in the best performance, as compared to the other two types described above. For example, the parallelogram design is lighter in weight than the heavy duty beam type suspension, yet its parallel or only substantially parallel control arms located in approximately the same vertical plane, achieve a high degree of wheel "tracking" necessary for safety and acceptable tire life. Moreover, while parallelogram suspensions are generally heavier in weight than the automatic leaf spring lift-suspensions, the parallelogram design allows, in most instances, for much heavier loads to be safely, carried, while achieving at least equal "tracking" as the leaf spring lift design. Still further, the parallelogram design usually allows the suspension to have a shorter overall design length than either of the two other designs, enabling it to be placed on certain vehicles where the leaf spring lift and/or beam type suspension will not fit.

While the parallelogram type suspension is currently a rather popular design of choice due to its advantageous features as set forth above, when adopted to become a "lift" is axle, difficulties have historically been experienced in devising an acceptable lift mechanism that is able to efficiently and reliably, over an acceptable useful life, perform its intended task (lifting and lowering effectively, safely and lawfully). Thus, a need arose in the art for a lift axle suspension system of the parallelogram type, for both steerable and non-steerable suspensions, which had a truly effective lift mechanism that can achieve the basic characteristics of: lawful operation, effective lift, efficient lowering, and safe and effective suspension operation when in road engagement and long life of the various parts, including the lift mechanism.

This need was met, with high commercial success, by the unique, parallelogram lift axle suspension system as disclosed in the aforesaid U.S. Pat. No. 5,403,031 (with or without its unique axle caster adjusting feature). Moreover, in certain of the embodiment disclosed in this '031 patent, another problem attendant various former lift suspensions known as the "accordion effect," (which shortened the life of the lift bellows), was overcome without the heretofore use of heavy, weight-adding, pivot bracketry. The '031 patent design achieved its improved results in this respect by a structure which enabled the lift bellows to expand and contract bi-directionally in a highly efficient manner, while achieving at the same time, as a parallelogram suspension, the known advantage of this type suspension. In addition, weight was reduced over the known heavy beam type suspensions and life expectancy of the lift bellows was increased due to the elimination of the "accordion effect" (a term used herein according to the meaning of that term in the aforesaid '031 patent). At the same time, efficient lifting was achieved in the embodiments of the invention disclosed in the '031 patent, while at the same time, the ability to carry more load in a lesser confined space than the known leaf spring lift design resulted. For the first known time then, the '031 patent disclosed a truly effective parallelogram type lift axle suspension system.

While advantageous, as well as being safe and effective for their intended purpose, the specific embodiments set forth in this '031 patent (as commercially exemplified by the Hendrickson Paralift™ and Paralift Ultra™ steerable and non-steerable lift axle suspension systems) were in need of further inventive improvement in order to meet certain particularly specialized applications in the art. For example, where, due to the large size and exceptionally heavy load carrying capacity of the vehicle on which the suspension was to be used, particularly high rigidity and strength of the suspension is required, whether the suspension is a steerable or non-steerable suspension, a need developed to achieve such high rigidity and strength without adding undue weight to the system. An example of such a need exists, for example, in the use of vehicles in mining of ore, in order to accommodate the exceptionally rough terrains often experienced in such operations.

In view of the above, it is apparent that despite the highly advantageous suspension designs disclosed in the aforesaid '031 patent, there remained a need in the art for a lift axle suspension, preferably of the parallelogram type, which incorporated the many unique and advantageous features of lift suspensions disclosed in the '031 patent, but at the same time provides a design of exceptional strength and rigidity, thereby to make it particularly useful in a wider variety of applications, steerable and non-steerable, including those uses where, due to the heavy duty nature of the vehicle and/or the environment of vehicle use (e.g., mining or other off-road operations) increased rigidity is required to assure appropriate high levels of safety and life expectancy of the suspension.

It is a purpose of this invention to fulfill this and other needs in the art which will become more apparent to the skilled artisan once given the following disclosure.

SUMMARY OF THE INVENTION

This invention fulfills the above-described needs in the art by providing a lift axle suspension system comprising:

a) a first pair of laterally spaced and longitudinally extending control arms, each having a first end and a second end;

b) a second pair of laterally spaced and longitudinally extending control arms, wherein the second pair of control arms is vertically spaced from the first pair of control arms thereby defining a generally box-shaped space between said control arms;

c) a frame bracket member;

d) a pivot connecting each of the first ends of the control arms to the frame bracket member;

e) an axle connecting member for connecting an axle to the suspension;

f) a pivot located at the second end of each of the control arms pivotally connecting each second end of said control arms to the axle connecting member;

g) a ride bellows;

h) an expandable and retractable lift bellows having a first end and a second end; at least one of:

i) a stabilizer member connecting the first end of the lift bellows to the axle connecting member; and j) a stabilizer member connecting the second end of the lift bellows to the frame bracket member; and k) a ride bellows, wherein the ride bellows and the lift bellows are so located and connected within the suspension such that when the ride bellows is inflated and the lift bellows is deflated, the suspension is lowered into load bearing road engagement and when the ride bellows is deflated and the lift bellows is inflated, the suspension is lifted out of load bearing road engagement.

In certain preferred embodiments of this invention, the suspension includes both stabilizer members. Moreover, in still further preferred embodiments, the stabilizer members (which may also be called "paddles") are generally U-shaped members and are located so that the two members oppose each other in a manner such that their respective opposing bottom ends (i.e., bases) form a pair of opposing platforms between which the lift bellows reside by way of each of the lift bellows ends being connected to one of the bases, and such that the legs of each "U" are pivotally connected (attached) to its respective suspension member, e.g., to the frame bracket (for the two legs of one of the U-shaped members) and to the axle connecting member (for the two legs of the second opposing U-shaped member). In still further preferred embodiments, the axle connecting member further includes a platform on which the ride bellows operatively resides. In such preferred embodiments, moreover, a wheel bearing "auxiliary" axle is attached to the suspension by the axle connecting member.

This invention will now be described with respect to certain embodiments as illustrated in the following drawings, wherein:

DETAILED DESCRIPTION OF THE INVENTION

FIGS. 1–4 illustrate a particularly preferred embodiment of a parallelogram lift axle suspension system according to this invention adopted for and mounted on a conventional heavy duty trailer. Certain parts in some of the drawings have been omitted for convenience so as to better illustrate certain of the other parts of the suspension.

Figure 5A:
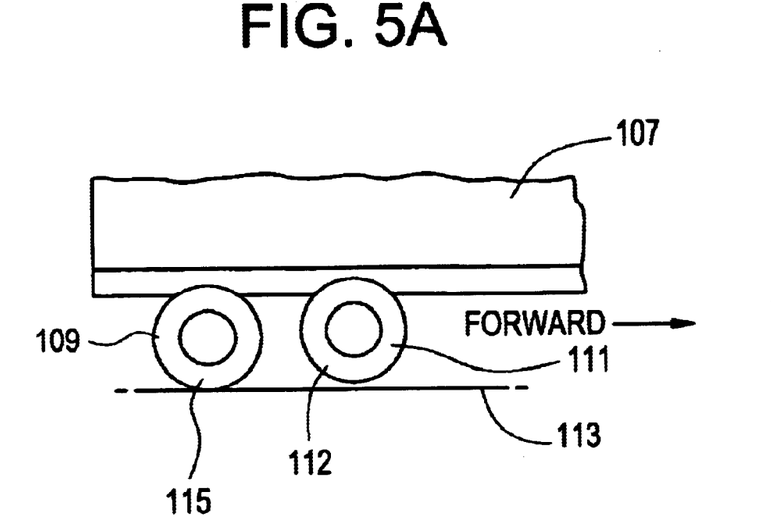
FIGS. 5a and b are side plan views of a typical truck employing an auxiliary lift axle suspension of this invention, in its raised and lowered position, respectively.
Figure 5B:
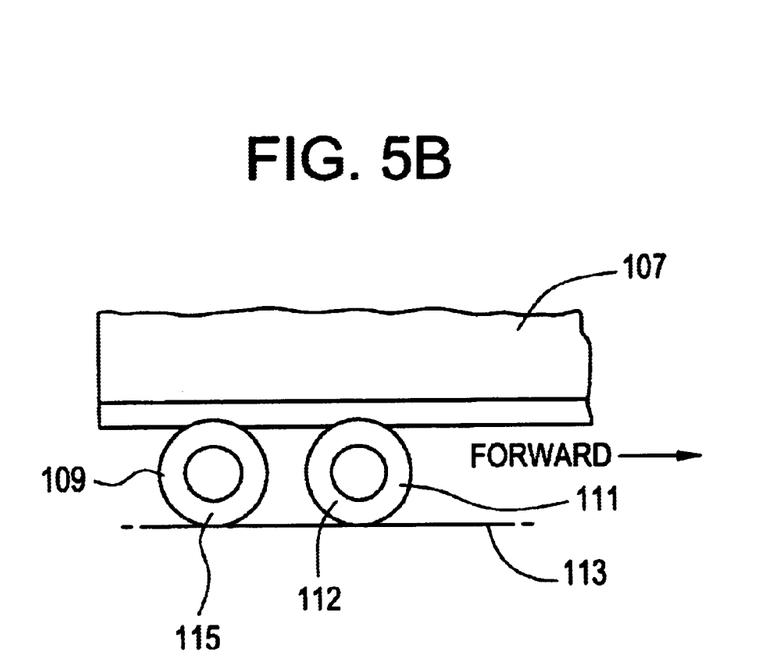

FIGS. 5a–5b are presented to simply illustrate one of the uses to which the suspensions of this invention is put. In this respect, vehicle 107 is illustrated in these FIGS. 5a–5b as a generic vehicle and is meant to represent a wide variety of vehicle types including such vehicles as heavy duty dump trucks, semi-trailers, trailers, mining vehicles and the like. Because of the exceptional rigidity (i.e., rugged, articulation force accommodating) nature of the suspension hereinafter described, these suspensions, as aforesaid, find particularly high utility when used in vehicles where rugged terrain, high curbs, poor road conditions and the like are anticipated to be encountered. However, the use of these suspensions is by no means limited to such environments because like their predecessor suspensions as disclosed in the aforesaid U.S. Pat. No. 5,403,031, they may also be advantageously used in over-the-road (e.g., highway) and other relatively gentle environments.

FIGS. 5a–5b, in this respect, then illustrate the suspensions 111 of this invention when used as an auxiliary wheeled lift axle suspension placed forward of rear axle 109 of a vehicle. FIG. 5a shows wheel bearing suspension ill in its raised (tires 112 lifted off of road surface 113) non-load bearing position. FIG. 5b shows wheel bearing suspension 111 in its lowered, road-engaging, lawful load bearing position. In this respect, it is understood that, as is known in the art, vehicle 107 normally has a forward steerable axle (not shown), as well as a standard rear axle 109 such that rear axle 109 (tires 115) together with the forward steerable axle (wheels and tires) form the primary means of vehicle support, such that suspension 111 may be operated to lift its wheels 112 off the road. Moreover, it is also understood that vehicle 107 may have many more axles that are liftable and/or non-liftable, all in conventional fashion. Still further, axle 109 may be a driven axle or a drive axle. Instead of axle 1 being in the so-called "pusher" position as illustrated, axle 1, instead, may be placed rearward of the last standard axle, so as to be in the so-called "tag" position. Both positions are known and are standard configurations in the art.

Turning now to FIGS. 1–4, it can be seen that the parallelogram structure achieved in this invention is very similar to that of the aforesaid U.S. Pat. No. 5,403,031, and as well, achieves substantially "bi-directional" expansion and contraction of the lift bellows to create long life thereof, as "bi-directional" is described in the '031 patent. There are, however, in this invention certain important unique changes from the embodiments disclosed in the '031 patent. As illustrated in this respect, there is provided a vehicle 107 (e.g., here, a typical trailer) having on either side a conventional longitudinal frame member 107' to which the lift axle suspension system 111 of this invention is attached by way of the trailer mount as illustrated. In a truck, the mounting (attachment to the frame) of the hanger and ride bellows will be somewhat different as is well known in the art and evident to the skilled artisan in the art.

Figure 1:
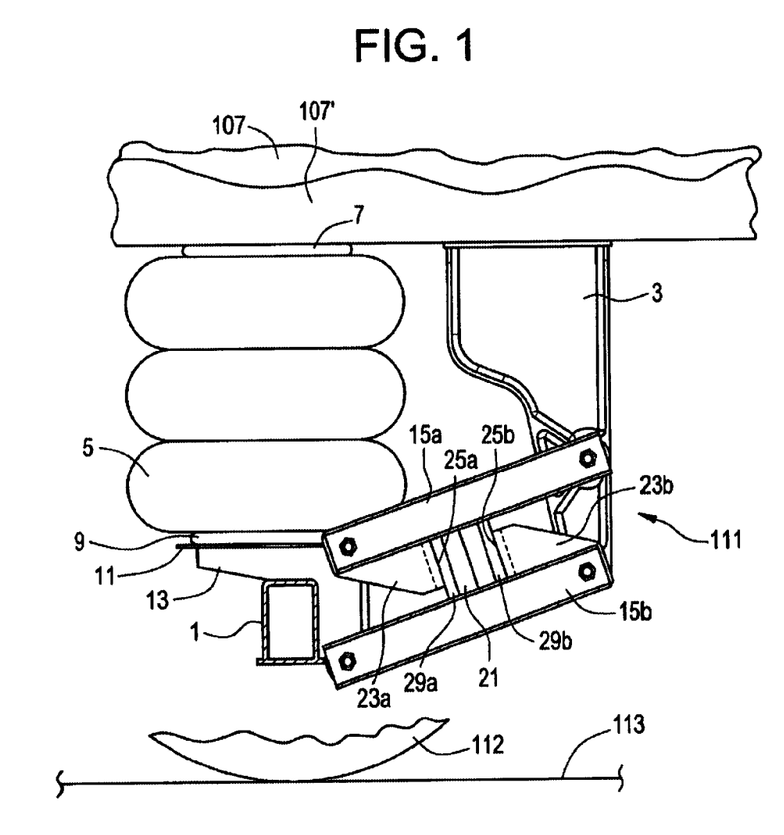
FIG. 1 is a partial side plan, partially sectionalized view of an embodiment of a parallelogram type lift axle suspension system as mounted on a conventional trailer according to this invention, shown in its lowered, road-engaging position.
Figure 2:
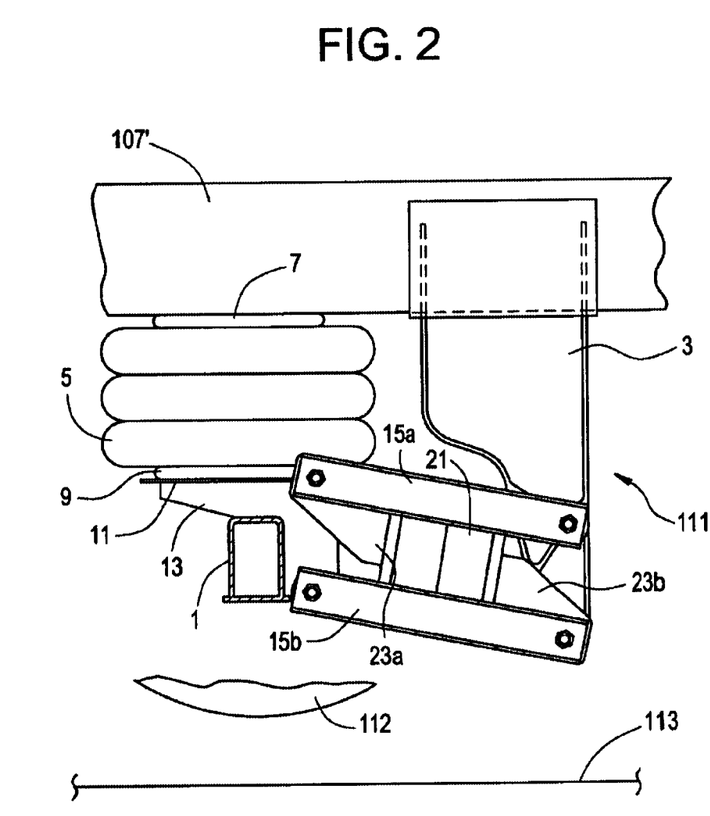
FIG. 2 is a partial side plan, partially sectionalized view of the embodiment illustrated in FIG. 1, shown in its raised, non-road-engaging position.

FIG. 1 illustrates suspension 111 in its lowered position such that tires 112 are fully and lawfully engaged with road surface 113 so that lift axle 1 carries its full, intended share of the load of vehicle 107. FIG. 2 then illustrates suspension 111 in its fully raised position such that tires 112 are lifted the required and an acceptably high distance from road surface 113.

As illustrated in the embodiment shown in FIGS. 1–4, suspension 111 is connected at one end to frame 107' of the vehicle (located on both sides of the vehicle) by hanger bracket 3 and at the other end by convoluted air bellows 5. Air bellows 5 are of known design and may be either convoluted as illustrated, lobbed, or of any conventional design adequate when expanded to provide a cushioning air-ride support for the vehicle, which is adequate to absorb its fair share of articulation forces experienced by the suspension during use.

Ride bellows 5 is connected at its upper end by upper plate 7 to vehicle 107's longitudinal frame member 107' and at its lower end by lower plate 9 to platform 11 of axle connection member 13 which, in turn, secures axle 1 within the suspension.

Figure 3:
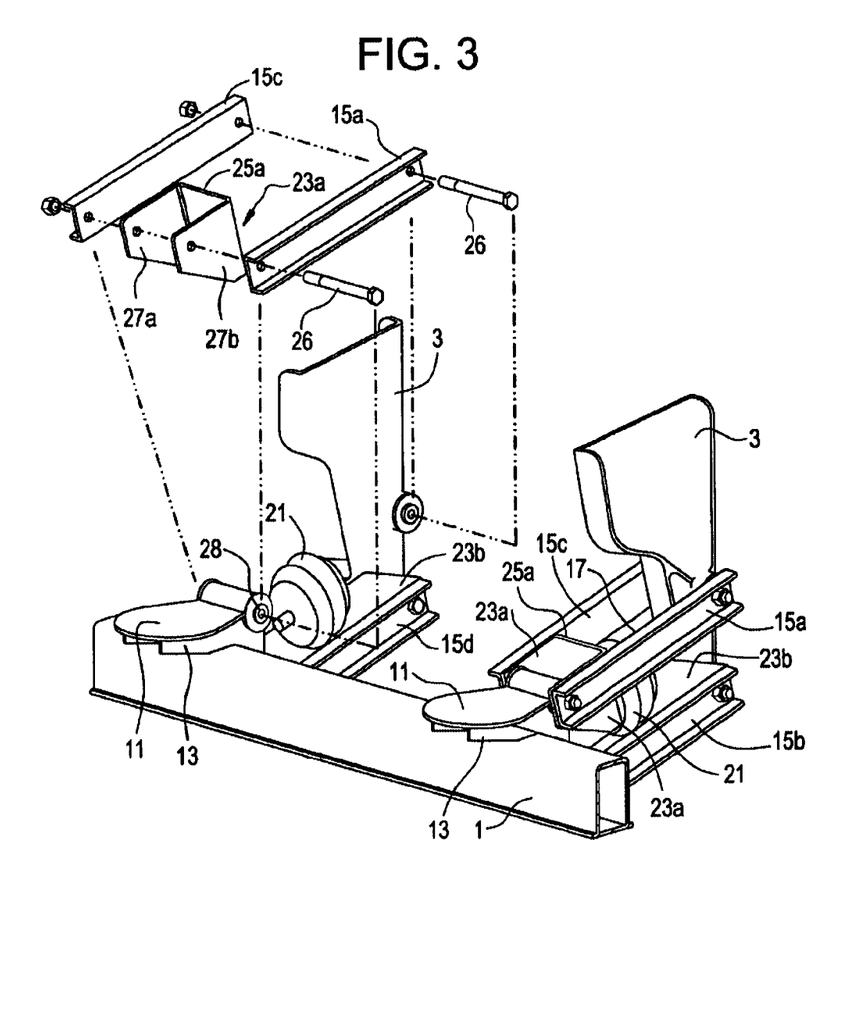
FIG. 3 is a top perspective, three dimensional, partially exploded view of the embodiment of FIG. 1.
Figure 4:
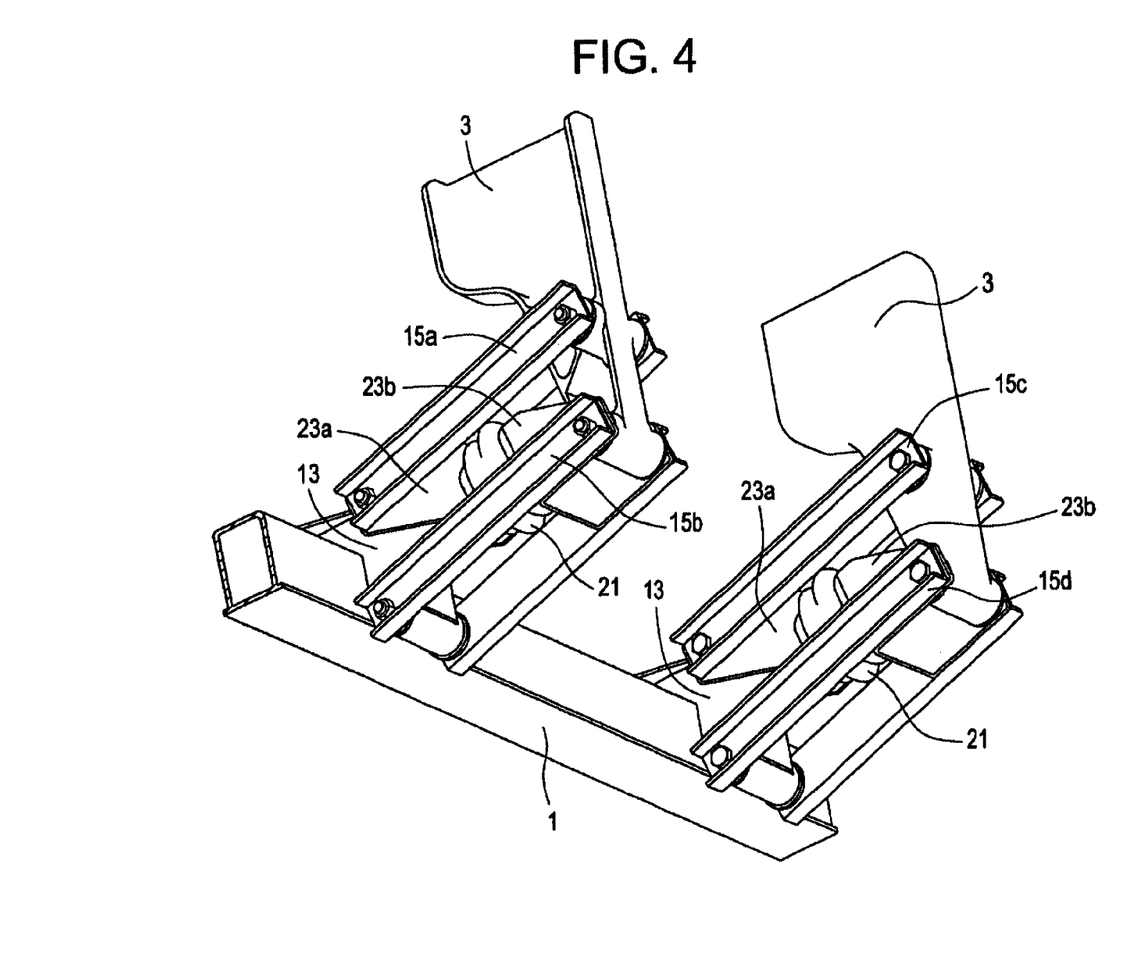
FIG. 4 is a bottom, three-dimensional view of the embodiment of FIG. 1.

Parallelogram suspension 111 is more fully illustrated in FIGS. 3–4. Suspension 111's lift mechanism, in this regard, includes four longitudinally extending control arms 15a, b, c and d, which form a box-like structure between them whose corners are defined by the four control arms (i.e., each corner has a control arm to define that corner). In certain preferred embodiments, this box-like structure forms a true parallelogram type suspensions, but variations therefrom are also contemplated. In short, while deviations from a true three dimensional parallelogram may be tolerated, in the preferred embodiments, all four arms are parallel to each other and pair 15a, b is spaced from pair 15c, d in such a manner as to form a substantially true parallelogram, box-shaped space 17 therebetween. One end of each of arms 15a, b, c and d is pivotally connected to hanger bracket 3, while the opposite end of each arm is connected to axle connection member 13. Other members may be used as the members to which the arms are connected as the type of suspension parts vary. In certain embodiments, each of these eight pivot connections includes a resilient bushing of known type (not shown) or, as to some or all of them, are non-resiliently but always pivotally connected.

A significant degree of stability is achieved by the use of these four (per vehicle side) control arms 15a–d. While these arms do not have to be parallel in all planes in the preferred embodiments, they are at least substantially parallel, with the outboard pair of control arms (15a, b) being in substantially the same vertical plane, while inboard control arms 15c, d are in their own substantially same vertical plane. Moreover, and also preferably, the upper pair of control arms 15a, c operate in substantially the same lateral plane while lower control arms 15b, d operate in their substantially same lateral plane, which is then spaced substantially uniformly below control arms 15a, c. In this way, the box-like space 17 becomes, as mentioned above, a true three-dimensional parallelogram as the preferred embodiment, thus, achieving, not only the benefits of the known parallelogram type suspensions discussed above, but the enhancement thereof, as further described below, enabling them to be used in rugged operations.

In this respect, the term "substantially" is used herein to denote that a perfect parallelogram is not always necessary to achieve, although it is preferred. Rather, minor variations from being perfectly parallel or exactly in the same plane can be tolerated and still achieve the advantages of "parallelogram" wheel tracking and weight reduction. For example, it is possible, being careful not to interfere with lift bellows 21, to cant in the inboard, outboard, up and/or down direction(s), the control arms, a few inches out of parallel or out of plane, and still achieve the benefits of this invention. In the most preferred embodiments, however, parallelism and planar correctness is maintained within reasonable manufacturing tolerances.

Adding to the uniqueness and rigidity of the suspensions of this invention is the manner in which lift bellows 21 are operatively connected within the suspension. Instead of using inboard extending appendages, protruding from the mid-portion of the control arms, as in the aforesaid U.S. Pat. No. 5,403,031, a pair of opposing, generally U-shaped "paddle" or stabilizer members 23a, b are employed. Stabilizer members 23a, b being "U" shaped, are, thus, formed of a base portion 25a, b from each of which bases extends a pair of opposing, spaced legs 27a, b (see FIG. 3). Members 23a are conveniently connected to axle connection member 13 at the same pivots used to connect upper control arms 15a, c to member 13. Members 23b, in turn, are conveniently connected to hanger bracket 3 at the same pivots used to connect lower control arms 15b, d to hanger bracket 3. In this manner, opposing bases 25a and 25b are appropriately spaced to accommodate lift bellows 21 therebetween by connecting end plates 29a and 29b located at opposite ends of bellows 21 to their respective bases 25a and 25b. In such structure, the stabilizer members 23a, b compliment and add to the strength and rigidity of the suspension which employs the four control arms for this purpose.

Further adding to the uniqueness and rigidity of the suspension of this invention is the manner in which the stabilizer members 23a, b and 25a, b are secured in place relative to the rest of the suspension. Traditionally, these stabilizer members are permanently affixed to the control arms by means of welding. Now referring to FIG. 3, it is seen in the exploded view that control arms 15a, b, c and d and that the stabilizers 23a, b and 25a, b are independent items. Pivot bolts 26 attach control arms 15a, b, c and d to frame hangers 3 and axle connection members 13. Additionally, by this connection, pivot bolts 26 capture stabilizers 25a. When pivot bolts 26 are torqued down, the clamp load generated, as necessary for proper operation of the suspension, secures the trailing arms to the bushing inner sleeve 28. This same clamp load also secures into position stabilizers 25a, b, thus, eliminating the need to weld the stabilizers into position. This securing technique and structure provides significant manufacturing, assembly and design advantages which, given this disclosure, will be evident to the skilled artisan.

It is to be noted here, as will be evident to the skilled artisan knowing of the '031 patent disclosure or its commercial embodiment (the Hendrickson Paralift and Paralift Ultra suspensions), that because of the geometry of the unique structure of the illustrated suspension, when lift bellows 21 expands, it does so substantially "bi-directionally" as that term is defined in the aforesaid '031 patent. The subject invention herein, in its preferred embodiment as illustrated, maintains this highly advantageous lift bellows preserving result. In short, the term "bi-directional" expansion or contraction simply means that bellows 21, which is designed for long life and best liftability, if expanded in its substantially axial direction only, in fact, expands in this manner, such that its ends (and, thus, the bases 25a and 25b) remain at substantially a constant angle with respect to each other. In this respect, bases 25a and 25b are preferably parallel to each other, but need not be exactly parallel and may vary (i.e., be offset) by 6° or more and still remain at this offset angle (or differ only by a degree or two therefrom) during expansion and contraction. However, in the preferred embodiments, the bases are indeed parallel to each other, within manufacturing tolerances which, at worst, vary no more than 1–2 degrees.

By creating the above-described connections together with the four (2 pair of) control arms and two opposing U-shaped members for each hanger bracket and ride bellows on each side of the vehicle, connected by axle 1 (and with or without a steerable mechanism, not shown, for convenience), a highly efficient, yet very stable and rugged lift axle suspension system is provided which may be used in all kinds of terrain, including those which are particularly hostile to suspensions, while at the same time achieving the benefits of a parallelogram type suspension and in the most preferred embodiments, "bi-directional" expansion and contraction for longer lift bellows life and efficient lifting.

In this respect, the air mechanism (piping, controls, etc.) for lowering and raising the suspension system by selectively inflating and deflating the air bellows is well-known and conventional in the art. Such, generally comprises an air control system connected to the air compressor of the vehicle's air brake system coupled by appropriate valving to manual controls which are conveniently located on the vehicle (e.g., on the side of or in the cab of the vehicle) for selectively operating the suspension. If the vehicle does not have an air brake system, a standard air compressor may be added with conventional piping and valves to supply the needed pressurized air.

Thus, by simple manipulation of conventional controls, and with reference to FIGS. 1 and 2, the pressurized air in bellows 5 which is holding tires (wheels) 112 in articulation absorbing ride comfort and lawful road engagement with road surface 113 may be vented to atmosphere, while air under pressure is sent to lift bellows 21, thereby expanding lift bellows against bases 25a, b causing (as shown in FIG. 2) suspension 111 to rotate about the various pivot points (e.g., at the ends of control arms 15), and thus, lifting wheels (tires) 112 from road surface 113. In this lifted condition, bellows 5 are collapsed because they no longer need to provide shock absorbing ride comfort due to axle 1 no longer being in road engagement. However, bellows 21 are inflated thereby to tightly, but in a cushioned fashion, maintain the auxiliary wheels out of engagement with the road surface. By properly selecting bellows 21 of an appropriate size for the system, suspension "bounce" (as is known in the art) and/or inadvertent contact with a ground object during operation may be prevented thereby preventing damage to the structural members of the suspension.

To lower the suspension (and tires) into full load-bearing road engaging position, the controls then are operated to effect the opposite operation. Bellows 21 are vented to atmosphere while bellows 5 are inflated, thereby lowering suspension 111 until tires 112 fully engage road surface 113. At this point, bellows 5 fulfills its intended roll as a shock absorber while the rugged, structural nature of the connections among the various elements, including the four control arms and opposing U-shaped members, create excellent wheel tracking, component protection, and stability even in very rough terrain.

While the drawings herewith, as referred to above, do not illustrate the use of additional shock absorbers such as shown in the aforesaid U.S. Pat. No. 5,403,031 or the particular axle to wheel connection which may be steerable or non-steerable, such additional features are contemplated for use herein, the use of shock absorbers or the latter steerable feature both being well-known and conventional in the art.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A lift axle suspension comprising:
   a) a first pair of longitudinally extending control arms, each control arm having a first end and a second end and wherein each control arm of said first pair is so located as to be in substantially the same vertical plane as the other control arm of said first pair;
   b) a second pair of substantially vertically spaced and longitudinally extending control arms, each control arm having a first end and a second end, and wherein each control arm of said second pair is so located as to be in substantially the same vertical plane as the other control arm of said second pair, said second pair of said control arms being horizontally spaced from said first pair of said control arms thereby defining a space between said first and said second pair of control arms;

c) a frame bracket member;

d) a first pivot member located at a first end of each said control arm and so located as to connect said first end of respective control arm to said frame bracket member;

e) an axle connecting member for connecting an axle to said suspension;

f) a second pivot member attached to a second end of each said control arm and so located so as to connect each of said second ends of a respective control arm to said axle connecting member;

g) a pair of expandable and retractable lift bellows, each having a first end and a second end;

h) a ride bellows; and i) a pair of spaced and opposing stabilizer members, each member being attached to and having located there between one of said pair of said lift bellows;

wherein each said stabilizer member is attached to a respective control arm of a said pair of control arms, each said stabilizer member being so located with respect to said pair of control arms so as to be located between and in substantially the same vertical plane as defined by said pair of control arms to which said stabilizer member is attached.

2. A lift axle suspension according to claim 1, which further includes an axle comprised of a first end and a second end and is attached to said suspension by said axle connecting member and a wheel located at each end of said axle.

3. A lift axle suspension according to claim 2, wherein said stabilizer member is pivotally attached to said axle connecting member and said frame bracket member by pivot bolt means comprising said pivot member in such a manner such that there is created a clamp load generated by said pivot bolt means when said means secures said stabilizer members and said control arms to said frame bracket member and said axle connecting member.

4. A lift axle suspension according to claim 1, 2 or 3, wherein the ride bellows and the lift bellows are so located and connected within said suspension such that when the ride bellows is inflated and the lift bellows is deflated, the suspension is lowered into load-bearing road engagement and when the ride bellows is deflated and the lift bellows is inflated, the suspension is lifted out of load bearing road engagement.

5. A lift axle suspension according to claim 1, wherein said suspension is a parallelogram suspension.

6. A lift axle suspension according to claim 1, wherein said control arms are so located as to define a generally box-shaped space between them defined by four corners, each corner having located thereat one of said control arms.

7. A lift axle suspensions according to claim 1, which includes said pair of opposing stabilizer members defining a lift bellows space therebetween, one stabilizer member being connected to said frame bracket member and the other stabilizer member attached to said axle connecting member and wherein said lift bellows is located within said lift bellows space.

8. A lift axle suspension according to claim 7, wherein said lift bellows has a first and second end, each end being connected to a different stabilizer member and so located such that when said lift bellows is inflated, said bellows expands substantially bi-directionally.

9. A lift axle suspension according to claim 8, wherein said stabilizer member attached to said frame bracket member comprises a generally U-shaped member whose two, spaced legs are each pivotally attached at their ends to said frame member.

10. A lift axle suspension according to claim 1, wherein said stabilizer member attached to said axle connecting member comprises a generally U-shaped member whose two-spaced legs are each pivotally attached at their ends to said axle connecting member.

11. A lift axle suspension according to claim 10, wherein said stabilizer member comprises attached to the frame bracket member a generally U-shaped member whose two spaced legs of said U-shape are each pivotally attached at their ends to said frame member.

12. A lift axle suspension according to claim 11, wherein said suspension includes the stabilizer members comprising a pair of spaced U-shaped members so located such that the base of each said U-shape is defined by a plate member, each plate member being spaced from and opposing the other plate member thereby to define a space therebetween defined by said opposing base plate members and wherein one end of a said lift bellows is attached to one said opposing plate member and the opposite end of said lift bellows is attached to the other opposing plate member.

13. A lift axle suspension according to claim 12, wherein said opposing base plate members are substantially parallel to each other.

14. A lift axle suspension according to claim 12, wherein the suspension is so constructed such that when said lift bellows is inflated, said bellows expand substantially bi-directionally.

15. A lift axle suspension according to claim 1, which further includes a platform to which one end of said ride bellows is attached.

16. A lift axle suspension according to claim 15, wherein said platform is connected to said axle connecting member.

17. A wheeled vehicle comprising a first wheeled axle suspension system as the primary means of road engaging support, and a longitudinal frame member located on each side of said vehicle, the vehicle further including as an auxiliary lift axle suspension attached to each said longitudinal frame member, the lift axle suspension of claim 1.

18. A wheeled vehicle comprising a first and second axle suspension system as the primary means of road engaging support for said vehicle, a pair of longitudinal frame members located on each side of said vehicle, and further including as an auxiliary lift axle suspension attached to a respective one of said pair of longitudinal frame members, the lift axle suspension of claim 5, 7, 8, 9, 14 or 16.

* * * * *